United States Patent
Beekmann et al.

(10) Patent No.: US 7,289,984 B2
(45) Date of Patent: Oct. 30, 2007

(54) SAMPLING APPROACH FOR DATA MINING OF ASSOCIATION RULES

(75) Inventors: Frank Beekmann, Duisburg (DE); Roland Grund, Bammental (DE); Andreas Rudolph, Heidelberg (DE)

(73) Assignee: International Business Machines Corporation, Armonk, NY (US)

(*) Notice: Subject to any disclaimer, the term of this patent is extended or adjusted under 35 U.S.C. 154(b) by 225 days.

(21) Appl. No.: 10/489,138

(22) PCT Filed: Jul. 26, 2002

(86) PCT No.: PCT/EP02/08335

§ 371 (c)(1),
(2), (4) Date: Sep. 16, 2004

(87) PCT Pub. No.: WO03/021477

PCT Pub. Date: Mar. 13, 2003

(65) Prior Publication Data

US 2005/0027663 A1 Feb. 3, 2005

(30) Foreign Application Priority Data

Sep. 4, 2001 (EP) .................... 01121122

(51) Int. Cl.
*G06F 17/30* (2006.01)
*G06N 5/00* (2006.01)

(52) U.S. Cl. .................... 707/3; 435/6; 702/1; 707/101
(58) Field of Classification Search .................... 707/3, 707/6, 7, 102, 101; 706/45; 435/6; 702/1
See application file for complete search history.

(56) References Cited

U.S. PATENT DOCUMENTS

| 6,032,146 A * | 2/2000 | Chadha et al. ................. 707/6 |
| 6,134,555 A * | 10/2000 | Chadha et al. ............. 707/102 |
| 6,189,005 B1 * | 2/2001 | Chakrabarti et al. ........... 707/6 |
| 6,260,038 B1 * | 7/2001 | Martin et al. ................... 707/7 |
| 6,636,862 B2 * | 10/2003 | Lundahl et al. ............. 707/101 |
| 6,853,920 B2 * | 2/2005 | Hsiung et al. ................. 702/1 |
| 6,905,827 B2 * | 6/2005 | Wohlgemuth et al. ......... 435/6 |

OTHER PUBLICATIONS

Agarwal et al. "Fast Algorithms for Mining Association Rules," Proceedings of the 20th VLDB Conference, Santiago, Chile, 1994.
Toivonen, Hannu. "Sampling Large Databases for Association Rules," Proceedings of the 22nd VLDB Conference, Mumbai (Bombay), India, 1996.

(Continued)

*Primary Examiner*—Wilbert L Starks, Jr.
(74) *Attorney, Agent, or Firm*—Schmeiser, Olsen & Watts; William E. Schiesser

(57) ABSTRACT

The current invention relates to a data mining technology for determining association rules within a multitude of N transactions each transaction comprising up to p different items. According to the invention a sample size n of the multitude of N transactions is determined based on precision requirements. The sample size n is chosen such, that it is at least in the order of magnitude of an estimated sample size n*. Finally association rules are computed based on a sample of the multitude of N transactions with sample size n according to any methodology for mining of association rules using the association rules as estimated association rules of the multitude of N transactions.

21 Claims, 3 Drawing Sheets

OTHER PUBLICATIONS

Zaki et al. "Evaluation of Sampling for Data Mining of Association Rules," Computer Science Dept., University of Rochester, Technical Report 617 (1996).

Zaki M J et al: "Evaluation of Sampling for Data Mining of Association Rules", Research Issues in Data Engineering, 1997. (Apr. 7, 1997 IEEE).

* cited by examiner

SAMPLING APPROACH FOR DATA MINING OF ASSOCIATION RULES

RELATED APPLICATION

This application is a national stage application of and claims priority from PCT Application PCT/EP02/08335, filed Jul. 26, 2002, which claims priority from EP01121122.4, filed Sep. 4, 2001. These disclosures are hereby incorporated by reference herein in their entireties. The above PCT International Application was published in the English language and has International Publication No. WO03/021477A2.

1. BACKGROUND OF THE INVENTION 1.1 Field of the Invention

The present invention relates generally to a method, system and program product for uncovering relationships or association rules between items in large databases.

1.2 Description and Disadvantages of Prior Art

Data mining is an emerging technical area, whose goal is to extract significant patterns or interesting rules from large databases; in general the area of data mining comprises all methods which are applicable to extract "knowledge" from large amounts of existing data. The whole process is known as knowledge discovery in databases. Finding association rules is one task for which data mining methods have been developed for.

Association rule mining has been introduced by Agrawal et al. (refer for instance to R. Agrawal and R. Srikant, Fast algorithms for mining association rules, in Proc. 20th VLDB Conf., September 1994.) and was motivated by shopping basket analysis. The rules were generated to find out which articles or items in a shop are bought together. To be more general association rules can be used to discover dependencies among attribute values of records in a database. Even further specific basket data usually consists of a record per customer with a transaction date, along with items bought by the customer. An example of an association rule over such a database could be that 80% of the customers that bought bread and milk, also bought eggs. The data mining task for association rules can be broken into two steps. The first step consists of finding all the sets of items, called as itemsets, that occur in the database with a certain user-specified frequency, called minimum support. Such itemsets are called large itemsets. An itemset of k items is called a k-itemset. The second step consists of forming implication rules among the large itemsets found in the first step.

Several algorithms have been developed to generate efficiently association rules. The well known and very successful APRIORI algorithm has been disclosed by Agrawal et al. for instance in above mentioned document. The most important value with which association rules are measured is the support value which is the relative frequency of occurrence of one item or several items together in one rule.

Today generating association rules in case of very large data bases (number of entries several million records and above) can be extremely time consuming. Many algorithms proposed for data mining of association rules make repeated passes over the database to determine the commonly occurring itemsets (or set of items). For large databases, the I/O overhead in scanning the database can be extremely high. This processing time is not only required for executing the mining algorithms themselves. A lot of time is also spent during the preprocessing steps. This includes the processing time for import of data and also processing time for transforming data for applying the algorithm. This preparation can take several hours of expensive CPU-time even in case of large MVS-systems.

To improve this performance equation it has been suggested instead of taking the whole database for the generation of association rules just to draw a sample and generate the association rules on that basis. This teaching has been introduced by H. Toivonen, Sampling Large Databases for Association Rules, Proceedings of the $22^{nd}$ VLDB Conference Mumbai (Bombay), India 1996 as well as Zaki, M. J., Parthasarathy, S., Li, W., Ogihara, M., Evaluation of Sampling for Data Mining of Association Rules, Computer Science Department, Technical Report 617, University of Rochester (1996).

Toivonen et al. stated an algorithm for detecting "exact" (not being based on some sample) association rules. Within this teaching sampling has been used only for the precalculation of the support values of the rules as one step in the algorithm; Toivonen et al. are completely mute about the idea of data mining for "estimated" (approximate) association rules based on some sample. Toivonen et al. also disclosed necessary bounds for sample sizes. Using an univariate approach the support value of an arbitrary association rule has been estimated. Toivonen et al. calculated the probability that an error between the true support value and the estimated support value exceeds a given threshold by using the binomial distribution and applying Chernoff bounds. With this they derived a formula for a sufficient sample size.

Zaki et al. took this idea up and published these bounds for approximate association rules generated under sampling. These bounds were also calculated using the univariate approach suggested by Toivonen including Chernoff bounds. It turned out by these investigations that these bounds are not very efficient since the required sample size can be very huge. As shown by Zaki et al. the required sample sizes can even become greater than the original database (!). Thus the current state of the art teaching is completely unsatisfactory and actually cannot be applied to real world problems.

Therefore, in principle the approach of data mining for association rules based on samples would allow to save processing time in the preprocessing step as well as in the analysis phase. But the fundamental problem which occurs is the accuracy of the generated association rules. If the sample is suitably chosen it is possible to estimate the error which appears by this approach. This error can be controlled by calculating sufficiently large sample sizes. But currently it is completely unclear how to determine reasonable sample sizes.

1.3 Objective of the Invention

The invention is based on the objective to improve the performance of the technologies for data mining of association rules.

2. SUMMARY AND ADVANTAGES OF THE INVENTION

The objectives of the invention are solved by the independent claims. Further advantageous arrangements and embodiments of the invention are set forth in the respective subclaims.

The current invention relates to a data mining technology for determining association rules within a multitude of N transactions each transaction comprising up to p different items.

According to the invention a sample size n of the multitude of N transactions is determined based on precision requirements. The sample size n is chosen such, that it is at least in the order of magnitude of an estimated sample size n*.

Finally association rules are computed based on a sample of the multitude of N transactions with sample size n according to any methodology for mining of association rules using the association rules as estimated association rules of the multitude of N transactions.

The important concept underlying all embodiments of the current invention is the observation that much smaller sample sizes can be determined, which at the same time satisfy the required precision requirements, if further parameters characterizing the multitude of transactions are introduced in the sample size determination. This is in strict contrast to the state of the art knowledge (refer for instance to the above mentioned Chernoff bounds) wherein no properties of the multitude of transactions are being used. As such characterizing properties the current invention suggests to use the size N of the multitude of transactions or the number p of different items occurring within the transactions.

Of course, once formulas for these sample sizes including such characterizing properties have been determined additional approximation techniques may be applied to eliminate these characterizing properties again. Even sample sizes based on such additional approximations represent a significant improvement over all state-of-the-art estimations.

As it can be seen by examples the sample sizes determined according to the current invention are much lower than the number of the original transactions and even independent of N. Therefore, the current teaching results in very significant performance improvements for data mining of association rules.

3. BRIEF DESCRIPTION OF THE DRAWINGS

Figure 3:
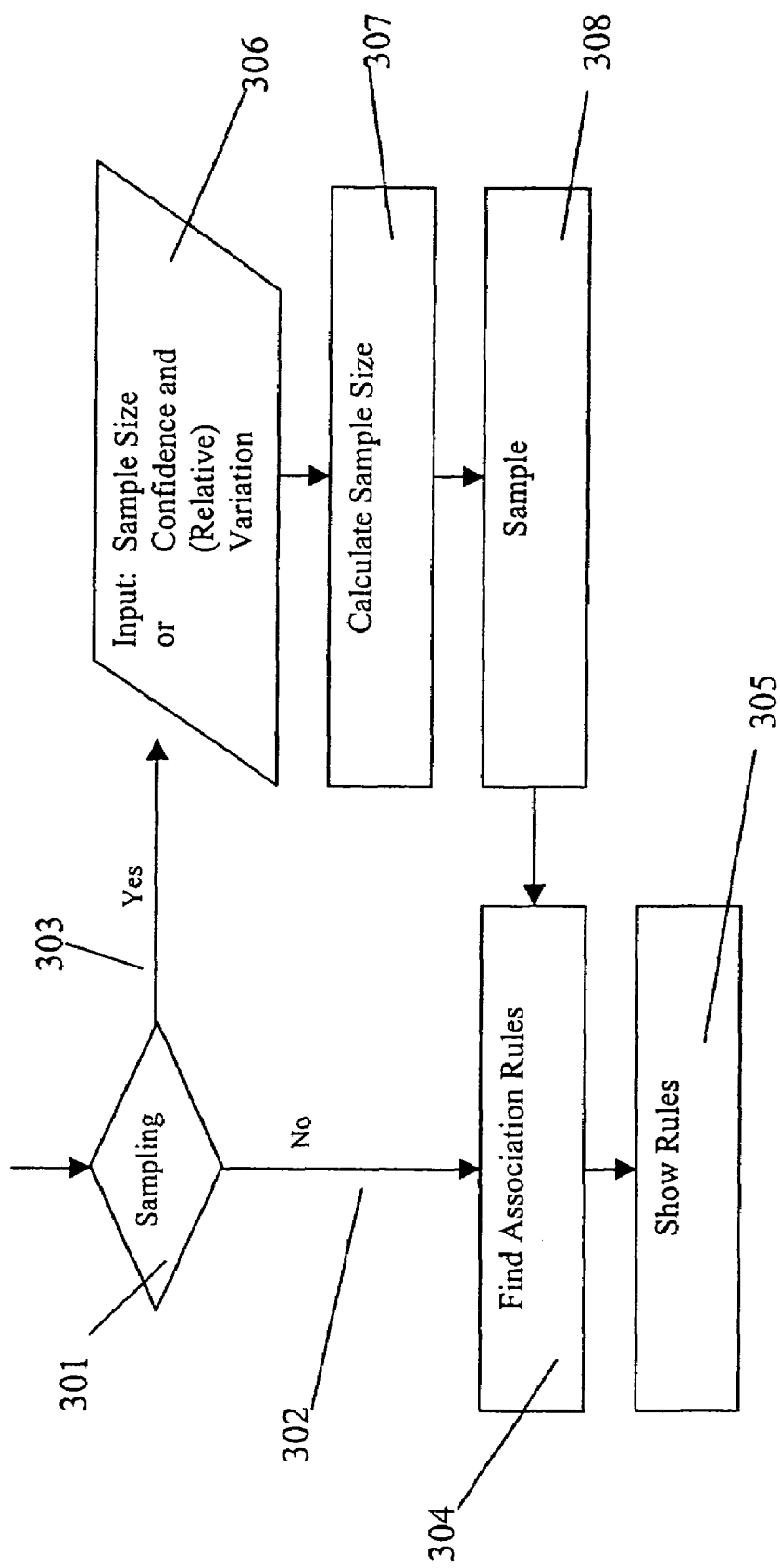

FIG. 3 visualizes the process flow for sampling of association rules in multivariate case.

Figure 4:
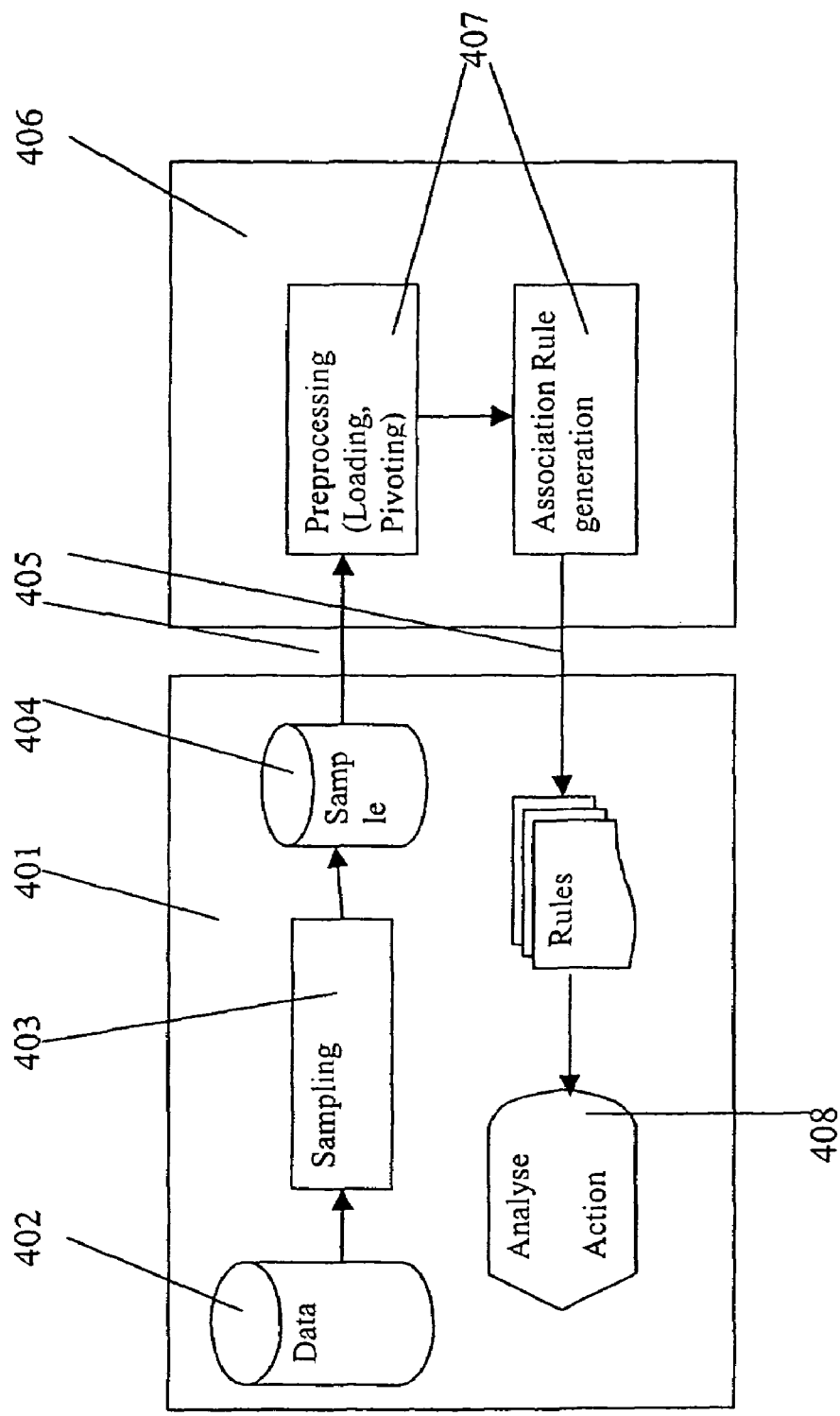

FIG. 4 depicts a distributed processing model for mining of association rules.

4. DESCRIPTION OF THE PREFERRED EMBOIDIMENT

In the drawings and specification there has been set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system—or other apparatus adapted for carrying out the methods described herein—is suited. A typical combination of hardware and software could be a general-purpose computer system with a computer program that, when being loaded and executed, controls the computer system such that it carries out the methods described herein. The present invention can also be embedded in a computer program product, which comprises all the features enabling the implementation of the methods described herein, and which—when being loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Within the current specification a transaction record, or transaction for short, refers to just a tuple of items; of course it is not required that such a record has been part of any computer transaction. The wording of transaction records is used for historical reasons only. Moreover an item may be represented by any type of attribute not necessarily related to an item within the real world.

4.1 Introduction

In the area of data mining so called association rules are a methodology to figure out unknown relations or rules from usually very large data sets. This methodology consists of the following proceeding. Given a set of so called items. These items could be purchases from supermarket basket data. Subsets of this set of items are so called transactions, for example beer and crisps as one transaction, whereas another transaction could consist of bred and butter. A set of items is often called itemset too. Therefore every transaction contains an itemset.

More formally the problem of mining association rules over basket data, that is a multitude of N transactions, can be stated as follows.

Let $I=\{i_1,i_2, \ldots, i_p\}$ be a set of p distinct attribute values, also called items. Each transaction T in the database D of transactions (that is a multitude of N transactions), has a unique identifier TID, and contains a set of items, such that $T \subseteq I$. An association rule is an expression $A \Rightarrow B$, where itemsets $A; B \subseteq I$, and $A \cap B = \emptyset$. Each itemset is said to have a support s if s % of the transactions in D contain the itemset (thus, the support measure represents a relative frequency). The association rule is said to have confidence c if c % of the transactions that contain A also contain B, i.e., c=support $(A \cup B)$/support(A), i.e., the conditional probability that transactions contain the itemset B, given that they contain itemset A. For example, we may have that 80% of the customers that bought bread and milk also bought eggs. The number 80% is the confidence of the rule, the support of the rule is support $(A \cup B)$. Data mining of association rules from such databases consists of finding the set of all such rules which meet the user-specified minimum confidence and support values.

The task of data mining for association rules can be broken into two steps:
1. Find all the large k-itemsets for k=1; 2; . . .
2. Generate rules from these large itemsets. Given that X is a large k-itemset, for every non-empty subset $A \subset X$, a rule of the form $A \Rightarrow B$ is generated, where $B=X-A$, and provided that this rule has the required confidence.

Note that all above mentioned measures are determined based on the set of all transactions under consideration.

For the purpose of performance improvements one could think at this point about to estimate these desired measures by a well chosen sample out of the set of all transactions. In the language of sampling theory the set of all transactions would correspond to the population, whose properties (i.e. relative frequencies and other measures) should be estimated by a well chosen sample. Limited to this sample one could calculate the relative frequencies of the desired events as estimators for the relative frequencies of these events on the population.

Consequently one then has to solve the following problems:

1. how should the sample be chosen such that possible systematic biases which could be caused by a possible order in the database could be eliminated as far as possible?
2. most important: how should the sample size be chosen to guarantee a desired precision of the estimators (in our case of the relative frequencies)?
3. how should the precision of the estimators be understood?

The first question aims to eliminate possible systematic errors. For instance, selecting for example every n-th record from a database could and could choose such serious systematic errors.

The second question deals with the point how many transactions should be taken from the whole population, that is the sample size. Intuitively it is quite clear that this problem is related with the precision which can be achieved due to the sample. This means that a sample of 100 transactions can guarantee a much less precision of the estimators than a sample of 10000 transactions.

The third question deals with the following: Assume the set of all transactions contains 1.000.000 transactions. If one takes a sample of 100 transactions by chance one can calculate the relative frequency of an item (say) A as an estimator for the relative frequency of item A on the whole population. If one takes by chance a second sample of 100 transactions, one can also calculate the relative frequency of item A based on this second sample as an estimator, but both calculated frequencies will be different. If one repeats this proceeding several hundred times then the so calculated relative frequencies will more or less scatter around the relative frequency of item A on the whole population.

4.2 Sampling Methods

One of the most well known sampling schemes is the so called Bernoulli sampling. This assumes that the data is given for example as a sequential file or data base where the records can be numbered von 1 to N and the data base can be traversed through along this ordering. Given a probability $\pi$, with which every element can be chosen, this sampling scheme works as following: For the i-th element a random experiment is made where this element is chosen with probability $\pi$. This can be done by generating a random number on the interval (0,1) where the i-th element is taken, if the considered random number is smaller than $\pi$, otherwise this element is refused.

Remark: In case of so called linear congruent random number generators it is quite important that the period of such a generator is large enough. This means that in case of a period of for example 5, after 5 random numbers out of the interval (0,1) the numbers are repeated which is of course not very sensible. As some rule of thumb one requires that the period L and the number N of the population should satisfy:

$\sqrt{N} \leq L$

Due to this sampling scheme the sample size is not a fixed number, but in the sense of probability theory a random variable whose statistical parameters as expectation E and variance Var are given as following:

$E_{BE}(n)=N\pi$ and $Var_{BE}(n)=N\pi(1-\pi)$

Additionally it is possible to calculate a confidence interval for a prescribed confidence level (1−α) where α is the specified probability of an error for the sample size n by the formula:

$$N\pi \pm u_{1-\frac{\alpha}{2}} \sqrt{N\pi(1-\pi)}$$

Here $$u_{1-\frac{\alpha}{2}}$$

is the percentile of the standard normal distribution N(0,1)-distribution for a given probability α. Given a probability α then the percentile $$u_{1-\frac{\alpha}{2}}$$

is the value which is exceeded with probability $$\frac{\alpha}{2}$$

by the unit normal distributed random variable (abbreviated by N(0,1)). Hence $$P\left(X > u_{1-\frac{\alpha}{2}}\right) = \frac{\alpha}{2}$$

where the density d of X (as N(0,1)-distributed random variable) is $$d(t) = \frac{1}{\sqrt{2\pi}} \exp\left(-\frac{1}{2}t^2\right)$$

The inclusion probability $\pi_i$ of the i-th observation to be put into the sample is then given by:

$\pi_i = \pi$ which means that for every element this probability is constant and equal to the prescribed probability $\pi$.

The inclusion probability $\pi_{ij}$ for the i-th as well as the j-th element to be put simultaneously into the sample is in this case equal $\pi^2$.

The big advantage of the sampling scheme consists in the fact that it can be easily implemented on a computer. The disadvantage consists in the fact that the sample size is no longer a fixed quantity but a random variable.

If one is interested in a fixed quantity for the sample size in advance then one has to use so called simple random sampling. This is an additional sampling scheme for which the inclusion probability for every observation to be put into the sample of size n is constant:

$$\pi_i = \frac{n}{N}$$

if n is the sample size and N the size of the population.

For the inclusion probability $\pi_{ij}$ that the i-th as well as the j-th element are put simultaneously into the sample one gets:

$$\pi_{ij} = \frac{n(n-1)}{N(N-1)}$$

Such a sampling scheme can be implemented as follows. Assume that $\epsilon_1, \epsilon_2, \ldots$ are independent random variables uniformly distributed on the interval [0,1].
1. If $$\varepsilon_1 < \frac{n}{N}$$

then take the element k=1, otherwise don't.
2. For the following elements k=2,3, . . . assume that $n_k$ is the number of the elements already taken under the first k−1 elements of the whole population. If we have $$\varepsilon_k < \frac{n - n_k}{N - k + 1}$$

in case of the k-th random number $\epsilon_k$, then the k-th element is taken, otherwise not.
3. The procedure terminates, if we have $n_k$=n.

The disadvantage of such a sampling scheme consists in the fact that the number of the already chosen elements has to be saved. On the other hand we have the advantage that now the sampling procedure terminates with the desired number of elements.

4.3 A Sampling Approach for Data Mining of Association Rules

This invention describes a methodology for computing association rules based on a sample instead of the whole population. It is suggested to use these association rules as estimated association rules of whole the population of transactions. As then the actual methodology for mining of association rules can be limited to the sample only significant performance improvements are achieved.

The important feature of the proposed invention is the technique for determining the sample size, while at the same time achieving prescribed precision requirements. As mentioned above already in contrast to the current state-of-the-art the essential concept of the current invention is the observation that much smaller sample sizes can be determined, which at the same time satisfy the required precision requirements, if further parameters characterizing the multitude of transactions are introduced in the sample size determination. In one embodiment of the current invention it is suggested to use as such characterizing property the size N of the multitude of transactions. In another embodiment of the current invention the number p of different items occurring within the transactions is used as characterizing property. Of course, once formulas for these sample sizes including such characterizing properties have been determined additional approximation techniques may be applied to eliminate these characterizing properties again. Even sample sizes based on such additional approximations represent a significant improvement over all state-of-the-art estimations. Or in other words: the significant advantage of achieving smaller sample sizes by taking into account further parameters characterizing the multitude of transactions will not be lost even if afterwards additional approximations eliminate these parameters again.

Estimations (for instance estimations for the support values) calculated according to the current state-of-the-art are done only based on a univariate analysis. An univariate analysis means that only a single value is estimated.

In contrast to that one embodiment of the current invention suggests a completely new approach by applying a multivariate estimation analysis. A multivariate analysis means that a vector is undergoing an estimation analysis wherein each component of that vector is an estimator and wherein all components are estimated simultaneously. For instance with respect to the support values the idea with this approach is to have a sample size which estimates the support of all of the single items to a specified correctness simultaneously. The proposed multivariate approach is based on confidence ellipsoids to determine the necessary sample sizes and has several advantages. The basic idea behind this method is that not only one support value per item is estimated but all support values simultaneously. If this vector of support values is close enough to the real existing vector of support values the structure in the data is also valid in the sample and therefore the rules will have good precision; or in other words, then the sample contains the same structure as the population and henceforth the same rules.

Such an embodiment based on a multivariate analysis is not even indicated within the teachings of Zaki et al. or Toivonen et al.

Additionally it is described how to select the records in a database such that these records are selected as randomly as possible.

4.3.1 Univariate Model

The basic concept is that the support value of any rule R can be seen as a relative frequency. This value can be approximately measured by an estimator as follows.

Suppose the whole database consists of N sequentially ordered elements (where each element is represented by a record). For each element we can construct a binary attribute which is 1 if the element supports the rule, i.e. when the item(s) of a rule appear(s) in the record, and 0 if the rule is not supported by the element. The mean value of this binary attribute is the support (denoted by p). Drawing a sample without replacement an unbiased estimator (an estimator is unbiased if the expectation value of the estimator equals the parameter which shall be estimated) for this support value is the mean of the binary attribute measured over all elements in the sample (This mean is denoted by $\hat{p}$). Moreover a confidence interval for the support value can be constructed. The idea behind a confidence interval is the following. The estimator drawn from the sample will approximate the true value, which means the estimator will not take on every time the same value. But if we draw a lot of samples and calculate an estimator it could be seen that these values are spread around the true value. We now try to find an interval around the calculated estimator such that we know that the true value is in this interval with a given probability 1−α. According to our sample method and the kind of the estimator we can use the following formula for constructing a confidence interval can be deduced:

$$\left(\hat{p} - u_{1-\frac{\alpha}{2}}\sqrt{\frac{N-n}{N}}\sqrt{\frac{\hat{p}(1-\hat{p})}{n-1}}\,;\,\hat{p} + u_{1-\frac{\alpha}{2}}\sqrt{\frac{N-n}{N}}\sqrt{\frac{\hat{p}(1-\hat{p})}{n-1}}\right)$$

where $\hat{p}$ is the estimator, $$u_{1-\frac{\alpha}{2}}$$

the percentile of the standard normal distribution, N the size of the whole population and n the sample size.

Given a probability α then the percentile $$u_{1-\frac{\alpha}{2}}$$

is the value which is exceeded with probability $$\frac{\alpha}{2}$$

by the unit normal distributed random variable (abbreviated by N(0,1)). Hence $$P\!\left(X > u_{1-\frac{\alpha}{2}}\right) = \frac{\alpha}{2}$$

where the density d of X (as N(0,1)-distributed random variable) is $$d(t) = \frac{1}{\sqrt{2\pi}}\exp\!\left(-\frac{1}{2}t^2\right)$$

That means if we calculate such an interval for a rule we can be sure that the probability that the true value is covered by this interval is 1−α. The formula shows that the length of this interval can be controlled by the sample size. The larger this is the smaller will be the confidence interval which can be used to calculate the sample size when the maximal length of the confidence interval is given.

The problem is that one cannot use the above formula directly since the value $\hat{p}$ is not known before the sample is drawn.

Therefore one need to consider the following formula where the second term of the sum is substituted. (The difference is in considering an estimator for the variance of the $\hat{p}$ in the first formula and the true variance of $\hat{p}$ in the second formula)

$$\left(\hat{p} - u_{1-\frac{\alpha}{2}}\sqrt{\frac{N-n}{N-1}}\sqrt{\frac{p(1-p)}{n}}\,;\,\hat{p} + u_{1-\frac{\alpha}{2}}\sqrt{\frac{N-n}{N-1}}\sqrt{\frac{p(1-p)}{n}}\right)$$

There are two possibilities to define the length of the confidence intervals. One is to give a relative error the other is to give an absolute error from the true value. Both possibilities are described below.

A user will state that the maximal approximation error should be a factor δ from the true value, hence a relative error. By that we can use the following known formula to calculate the sample size:

$$n = \frac{u_{1-\frac{\alpha}{2}}^2 N p(1-p)}{(N-1)\delta^2 p^2 + u_{1-\frac{\alpha}{2}}^2 p(1-p)} \qquad \text{eq. 1}$$

The problem in this formula is that we need to know the true value. Seeing that this value exceeds a given threshold Minsup and that the function is decreasing in p, we can determine a bound for the minimum sample size by using the formula:

$$n = \frac{u_{1-\frac{\alpha}{2}}^2 N\, Minsup(1 - Minsup)}{(N-1)\delta^2 Minsup^2 + u_{1-\frac{\alpha}{2}}^2 Minsup(1 - Minsup)} \qquad \text{eq. 2}$$

The following example shall demonstrate the use of the formula:

Given a database of 4000000 records. The specified Minsup value is 0,01 and the estimator for a rule R shall not differ from the true value by 1% with a probability of 90%. Then it is necessary to draw a sample of the size 1415204 elements.

Zaki suggested using the following formulae for estimating that the estimated value $\hat{p}$ derived from a sample of size n is less {greater} than (1−δ) {(1+δ)} from the true value p which means that the relative error is less {greater} than a factor δ from p:

$$P(\hat{p} \leq (1-\delta)p) \leq \exp(-\delta^2 np/2)$$

$$P(\hat{p} \geq (1+\delta)p) \leq \exp(-\delta^2 np/3)$$

From that he derived necessary sample sizes by comparing the right hand sides with a given error probability α.

By that he obtains:

$n = -2ln(\alpha)/p\delta^2$ for the lower bound $n = -3ln(\alpha)/p\delta^2$ for the upper bound.

By that Zaki does not consider a closed confidence interval as we did above. He only stated probabilities for open intervals with which we will deal later. At this point we can state that our approach lead to better accuracy by taking a smaller sample. To show that our approach outperforms Zakis approach consider again the calculation of the sample size. We can give the approximate formula for the sample size (representing an approximation of eq. 1):

$$n = \frac{u_{1-\frac{\alpha}{2}}^2 (1-p)}{\delta^2 p}$$

This will be compared with the lower bound formula of Zaki (which gives the smallest sample size according to Zaki).

Both formulae have the same denominator, hence it suffices to show that $$-2\ln(\alpha) \geq u_{1-\frac{\alpha}{2}}^2 (1-p)$$

In praxis usually the values 0.1, 0.05 and 0.01 are chosen for $\alpha$. The following table shows the value $-2\ln(\alpha)$ and $$u_{1-\frac{\alpha}{2}}^2$$

for the above mentioned values of $\alpha$.

| $\alpha$ | $-2\ln(\alpha)$ | $u_{1-\frac{\alpha}{2}}^2$ |
|---|---|---|
| 0.1 | 4.606 | 2.701 |
| 0.05 | 5.996 | 3.842 |
| 0.01 | 9.21 | 6.635 |

Hence $-2\ln(\alpha)$ is always larger than $$u_{1-\frac{\alpha}{2}}^2$$

for the stated values from which we can conclude that the above given inequality holds for these values.

The other possibility to calculate the sample size is related to specify an absolute error d between the estimator and the true value. Based on the absolute error measure d the following formula may be deduced:

$$n = \frac{\frac{u_{1-\frac{\alpha}{2}}^2 p(1-p)}{d^2}}{1 + \frac{1}{N}\left(\frac{u_{1-\frac{\alpha}{2}}^2 p(1-p)}{d^2} - 1\right)} \quad \text{eq. 3}$$

This formula again needs knowledge about the true parameter p. But an analysis shows that the stated formula has the biggest value when p=0.5. Hence one possibility to calculate the sample size is to plug in p=0.5 resulting in sample size:

$$n = \frac{\frac{u_{1-\frac{\alpha}{2}}^2}{4d^2}}{1 + \frac{1}{N}\left(\frac{u_{1-\frac{\alpha}{2}}^2}{4d^2} - 1\right)} \quad \text{eq. 4}$$

The following example will illustrate the calculation. Given a population size of 7000000, a confidence level of 99% and an absolute error of 0.01, we obtain a sample size of 16551 which marks a significant improvement over the state-of-the-art.

Toivonen et al. suggest to take the following sample size given an absolute error d and an error probability $\alpha$:

$$n = \frac{1}{2d^2} \ln\frac{2}{\alpha}$$

As above we can show that our approach yields a smaller sample size. Again we use an approximate formula:

$$n = \frac{u_{1-\frac{\alpha}{2}}^2 p(1-p)}{d^2}$$

such that it suffices to show that $$\frac{1}{2}\ln\frac{2}{\alpha} \geq u_{1-\frac{\alpha}{2}}^2 p(1-p).$$

Noting that $p(1-p) \leq 0.25$ for $0 \leq p \leq 1$ it suffices to show:

$$2\ln\frac{2}{\alpha} \geq u_{1-\frac{\alpha}{2}}^2$$

As above we show that this inequality holds at least for the common values of $\alpha$.

| $\alpha$ | $2\ln\frac{2}{\alpha}$ | $u_{1-\frac{\alpha}{2}}^2$ |
|---|---|---|
| 0.1 | 5.991 | 2.701 |
| 0.05 | 7.370 | 3.842 |
| 0.01 | 10.597 | 6.635 |

With that it is shown that our approach yields smaller sample sizes than that of Toivonen et al.

We now state another result which can be applied to calculate necessary sample sizes. If we consider the confidence interval above, there are two kinds of errors which can occur. One is that the true support value is larger than the calculated upper bound, the other is that the true support value is less than the lower bound. In practical circumstances there are situations where one only need to have a confidence interval for the true value which is bounded only to one side (Compare Zaki et al.).

If one is interested only in obtaining a bound which will be exceeded by the true value only with a probability $\alpha$ one can use the confidence interval:

$$\left(-\infty; \hat{p} + u_{1-\alpha}\sqrt{\frac{N-n}{N}}\sqrt{\frac{\hat{p}(1-\hat{p})}{n-1}}\right)$$

This means one can be sure that the true support value of a rule will not be greater than the upper bound. This can be of importance if one will control the error that a rule which has a support value greater than the Minsup threshold has not this property in the sample. For example assume the Minsup value is given and the support value of a rule in the sample yields a confidence interval stated above with an upper bound less than Minsup. Then the probability that this rule has got a true support value on the population which is greater than Minsup is less than $\alpha$.

The other case which can be of interest uses the following confidence interval which has only a lower bound:

$$\left(\hat{p} + u_{1-\alpha}\sqrt{\frac{N-n}{N}}\sqrt{\frac{\hat{p}(1-\hat{p})}{n-1}}; +\infty\right)$$

This confidence interval can be used if one is only interested that the error that the true support value is less than the lower border is less than the error probability $\alpha$. This can be the case when the error shall be controlled that a rule has a support value greater than the Minsup threshold whereas the true value is less than this threshold. For example if in the sample a rule will have a support value such that the lower bound of the corresponding confidence interval is greater than the Minsup threshold then the true value is smaller than this bound only with an error probability of at most $\alpha$.

From both formulae we can derive the sample sizes in the same way as we did above. The only thing which changes in the formulae is that $$u^2_{1-\frac{\alpha}{2}}$$

is substituted by $$u^2_{1-\alpha}.$$

Hence the sample size for a single bounded confidence interval is $$n = \frac{u^2_{1-\alpha}Np(1-p)}{(N-1)\delta^2 p^2 + u^2_{1-\alpha}p(1-p)} \quad \text{eq. 5}$$

when a relative error of $\delta$ of the true value is given.

Substituting p by Minsup as explained above yields $$n = \frac{u^2_{1-\alpha}NMinsup(1-Minsup)}{(N-1)\delta^2 Minsup^2 + u^2_{1-\alpha}Minsup(1-Minsup)} \quad \text{eq. 6}$$

When an absolute error is given one can use the following formula for calculating the sample size:

$$n = \frac{\frac{u^2_{1-\alpha}p(1-p)}{d^2}}{1 + \frac{1}{N}\left(\frac{u^2_{1-\alpha}p(1-p)}{d^2} - 1\right)} \quad \text{eq. 7}$$

where p can be chosen as 0.5 such that is the largest value for n resulting in $$n = \frac{\frac{u^2_{1-\alpha}}{4d^2}}{1 + \frac{1}{N}\left(\frac{u^2_{1-\alpha}}{4d^2} - 1\right)} \quad \text{eq. 8}$$

The sample sizes obtained by these formulae are smaller than the sample size calculated for the corresponding closed confidence interval. Since the latter sample sizes have been shown to be smaller than the sample sizes suggested by Zaki et al. and Toivonen et al. so are the sample sizes derived here.

4.3.2 Multivariate Model

In the precedent section we showed how to use confidence intervals for estimating the support of an item or a set of items which indicates the support of a rule. As explained above the meaning of a confidence interval with confidence level of $(1-\alpha)$ is that in $(1-\alpha)\times 100$ percent of all samples the relative frequency of an item A on the whole population is covered by the corresponding confidence interval.

A generalization (in the sense of considering p items simultaneously) of this idea consists in the construction of a so called confidence ellipsoid at confidence level $(1-\alpha)$. A confidence ellipsoid in p dimensions defines a region in p dimensions, such that the true value is enclosed in this region with a certain probability $(1-\alpha)$.

Figure 1:
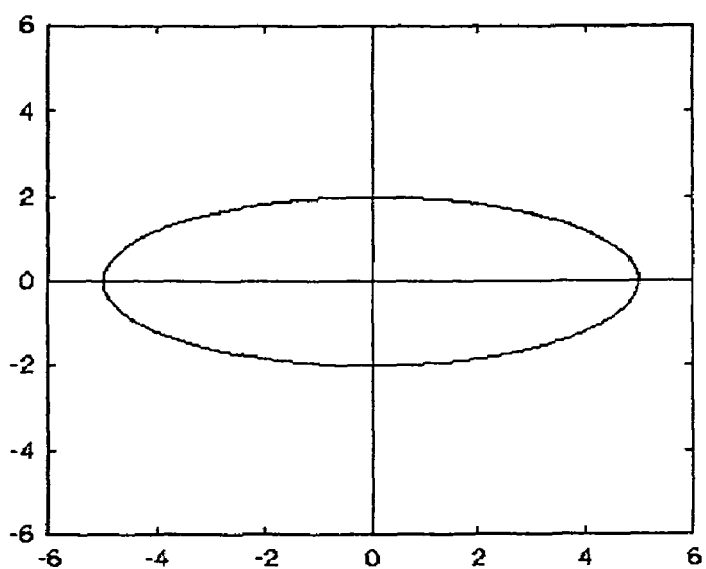
FIG. 1 shows an example of a confidence ellipsoid with p=2.
Figure 2:
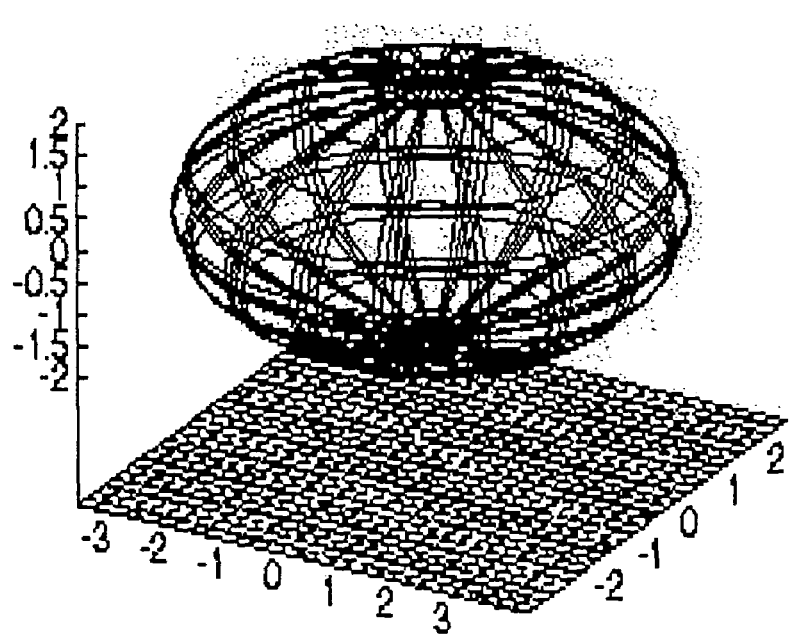
FIG. 2 shows an example of a confidence ellipsoid with p=3.

In case of p=2 items this ellipsoid is an ellipsis. FIG. 1 shows an example of a confidence ellipsoid with p=2. In case of p=3 items an example of a confidence ellipsoid is shown within FIG. 2.

On the other hand the width (the area or the volume respectively) is a measure for the precision. Therefore if one requires a certain precision one could choose the sample size such, that the width (the area or the volume respectively) does not exceed a prescribed bound (for a desired confidence level).

To estimate the supports of single items simultaneously it is necessary to transform every transaction into a binary vector. Every component of such a vector then corresponds to an item, where a value 1 means that the considered item exists in the considered transaction and a value 0, that the item is not present. Note that the dimension of the binary vectors is implied by the number p of all possible single items.

Now assume that we took a sample from a population with p-dimensional vectors denoted by $$Y_i = \begin{bmatrix} Y_i^{(l)} \\ \vdots \\ Y_i^{(p)} \end{bmatrix}$$

for i=1, ..., N. Further we define:

$$\overline{Y}.^{(k)} = \frac{1}{N} \sum_{i=1}^{N} Y_i^{(k)}$$

$$\overline{Y}. = \frac{1}{N} \sum_{i=1}^{N} Y_i = \begin{bmatrix} \overline{Y}.^{(l)} \\ \vdots \\ \overline{Y}.^{(p)} \end{bmatrix}$$

$$S_{Y^{(k)}, Y^{(k)}} = S_{Y^{(k)}}^2 = \frac{1}{N-1} \sum_{i=1}^{N} \left( Y_i^{(k)} - \overline{Y}.^{(k)} \right)^2$$

for $k = 1, \ldots, p$;

$$S_{Y^{(k)}, Y^{(l)}} = \frac{1}{N-1} \sum_{i=1}^{N} \left( Y_i^{(k)} - \overline{Y}.^{(k)} \right) \left( Y_i^{(l)} - \overline{Y}.^{(l)} \right)$$

for $k \neq l = 1, \ldots, p$ $$\sum_y = \left( S_{Y^{(k)}, Y^{(l)}} \right)_{k,l=1,\ldots p}$$

The vectors in the sample will be denoted by $y_i$ such that we get the corresponding quantities on the sample whereas Y is replaced by y and N by n, with the exception that the covariance matrix of the sample is denoted by $$S = (S_{y^{(k)}, y^{(l)}})_{k,l=1,\ldots,p}$$

where $S_{y^{(k)}, y^{(l)}}$ are the corresponding estimators for the covariances based on the sample.

With this notation one can prove the following theorems for a simple random sample:

Theorem 1:

$\overline{y}.$ is an unbiased estimator of $\overline{Y}.$ $$Cov(\overline{y}.) = \frac{1}{n}\left(1 - \frac{n}{N}\right) \sum_y$$

is the covariance matrix of $\overline{y}.$ $$\overrightarrow{Cov(\overline{y}.)} = \frac{1}{n}\left(1 - \frac{n}{N}\right) s$$

is an unbiased estimator of $Cov(\overline{y}.)$

Additionally we can state a central limit theorem for the estimator $\overline{y}.$:

Theorem 2:

Assume in the situation of a simple random sampling the following:

$n_v \to \infty$ and $(N_v - n_v) \to \infty$, if $n_v \to \infty$ let $I_v = \{1, \ldots, N_v\}$ $$Y_{vi} = \begin{bmatrix} Y_{vi}^{(l)} \\ \vdots \\ Y_{vi}^{(p)} \end{bmatrix} \text{ for } i \in I_v \quad y_{vi} = \begin{bmatrix} y_{vi}^{(l)} \\ \vdots \\ y_{vi}^{(p)} \end{bmatrix} \text{ for } i = 1, \ldots, n_v$$

$$I_{v\tau}^{(k)} = \left\{ i \in I_v : \left| Y_{vi} - \overline{Y}_{v.}^{(k)} \right| > \tau \sqrt{Var\left( \sum_{i=1}^{n_v} y_{vi}^{(k)} \right)} \right\}$$

for all $\tau > 0$ and $k = 1, \ldots, p$ $\lim_{v \to \infty} \sup \rho_v^{(k)^2} < 1$ for all $k = 1, \ldots, p$ with $$\rho_v^{(k)^2} = \max_{a_j} \left| \rho\left( Y_v^{(k)}, \sum_{j \neq k} a_j Y_v^{(j)} \right) \right|$$

the multiple correlation coefficient between the k-th and the remaining p−1 variables $$\overline{y}_{v.} = \frac{1}{n_v} \sum_{i=1}^{n_v} y_{vi}$$

$Cov(\overline{y}_{v.})$ the covariance matrix of $\overline{y}_{v.}$

Then we have: the convergence in distribution of the quantity $$Cov(\overline{y}_{v.})^{-\frac{1}{2}} (\overline{y}_{v.} - E(\overline{y}_{v.}))$$

against an $N(0, Id_p)$-distribution is equivalent with the condition $$\lim_{v \to \infty} \frac{\sum_{i \in I_{v\tau}} \left( Y_{vi}^{(k)} - \overline{Y}_{v.}^{(k)} \right)^2}{\sum_{i \in I_v} \left( Y_{vi}^{(k)} - \overline{Y}_{v.}^{(k)} \right)^2} = 0$$

where the p-dimensional $N(0, Id_p)$-distributed random variable Y has got the density-function f $$f(y) = (2\pi)^{-\frac{p}{2}} \exp\left( -\frac{1}{2} y^t y \right)$$

(note that y is also p-dimensional)

This theorem opens the possibility to construct at least approximate confidence ellipsoids for the vector $\overline{Y}.$ Because we are interested in multivariate considerations (contrary to the state-of-art and the improvement given in the preceding section) we now want to consider confidence ellipsoids and their construction.

Let us consider first the situation that the observations are independent and identically multivariate normal-distributed p-dimensional vectors with expectation vector $\mu_0$ and covariance matrix $\Sigma$, whose inverse exists.

Now let us assume that we want to construct the desired confidence ellipsoid for the unknown expectation vector $\mu_0$ based on a sample of size n. Such an ellipsoid is given by:

$$K_\Sigma = \left\{ \mu_0 \, \middle| \, n(\overline{x} - \mu_0)^t \sum^{-1} (\overline{x} - \mu_0) \leq \chi^2_{1-\alpha:p} \right\}$$

where $\overline{x}$ is given by $$\overline{x} = \frac{1}{n} \sum_{i=1}^{n} x_i$$

and $\chi^2_{1-\alpha:p}$ is the value such that given a probability $\alpha$ then $$P(Y \geq \chi^2_{1-\alpha:p}) = \alpha$$

where Y has a $\chi^2$-distribution with p degrees of freedom, i.e. the density function $$f(x) = \begin{cases} \dfrac{x^{\frac{p}{2}-1} \exp\left(-\dfrac{x}{2}\right)}{2^{\frac{p}{2}} \Gamma\left(\dfrac{p}{2}\right)} & \text{for } x > 0 \\ 0 & \text{for } x \leq 0 \end{cases}$$

where $\Gamma$ denotes the Gamma-function $$\Gamma(y) = \int_0^\infty t^{y-1} \exp(-t) dt$$

Thus $\chi^2_{1-\alpha:p}$ is the percentile of the $\chi^2$-distribution with p degrees of freedom.

This is due to the fact that the quantity $n(\overline{x}-\mu_0)'\Sigma^{-1}(\overline{x}-\mu_0)$ is $\chi^2$-distributed with p degrees of freedom, if the data is multivariate normal-distributed.

In case that the covariance matrix $\Sigma$ is unknown this matrix has to be estimated from the data. A possible estimator for $\Sigma$ is given by:

$$S = \frac{1}{n-1} \sum_{i=1}^{n} (x_i - \overline{x})(x_i - \overline{x})^t$$

The corresponding confidence ellipsoid is then given by:

$$K_S = \left\{ \mu_0 \, \middle| \, n(\overline{x}-\mu_0)^t S^{-1}(\overline{x}-\mu_0) \leq \frac{(n-1)p}{n-p} F_{1-\alpha:p,n-p} \right\}$$

where now $F_{1-\alpha:p,n-p}$ is the value such that given a probability $\alpha$ then $$P(Y \geq F_{1-\alpha:p,n-p}) = \alpha$$

where Y has a F-distribution with $m_1$ (=p) and $m_2$ (=n-p) degrees of freedom, i.e. the density function $$f(x) = \begin{cases} \dfrac{\Gamma\left(\dfrac{m_1+m_2}{2}\right)}{\Gamma\left(\dfrac{m_1}{2}\right)\Gamma\left(\dfrac{m_2}{2}\right)} m_1^{\frac{m_1}{2}} m_2^{\frac{m_2}{2}} y^{\frac{m_1}{2}-1} (m_2 + m_1 y)^{-\frac{m_1+m_2}{2}} & \text{for } x \geq 0 \\ 0 & \text{for } x < 0 \end{cases}$$

where $\Gamma$ denotes the Gamma-function.

In case that the condition that the data is multivariate normal-distributed is not fulfilled and if instead of that a central limit theorem for the estimator of the expectation vector holds then the above given confidence ellipsoids are only approximately valid. Based on such an approximation the following replacements can be introduced:

the expectation vector $\mu_0$ by the vector $\overline{Y}$.

the estimator $\overline{x}$ for the expectation vector $\mu_0$ by the estimator $\overline{y}$.

the covariance matrix $\Sigma$ respectively its estimator S by the covariance matrix $\Sigma_Y$ respectively its estimator s If we assume that central limit theorem holds then the given confidence ellipsoids remain as presented. Therefore we get for the ellipsoid $K_{\Sigma_y}$ the ellipsoid $$K_{\Sigma_y} = \left\{ \overline{Y}. \, \middle| \, n(\overline{y}.-\overline{Y}.)^t \sum_y^{-1} (\overline{y}.-\overline{Y}.) \leq \chi^2_{1-\alpha:p} \right\}$$

and for $K_s$:

$$K_s = \left\{ \overline{Y}. \, \middle| \, n(\overline{y}.-\overline{Y}.)^t s^{-1}(\overline{y}.-\overline{Y}.) \leq \frac{(n-1)}{n-p} F_{1-\alpha:p,n-p} \right\}$$

Note that $$F_{1-\alpha:p,n-p} \to \frac{1}{p} \chi^2_{1-\alpha:p} \text{ for } n \to \infty$$

$$\frac{n-1}{n-p} \geq 1 \text{ for } p \geq 1$$

which gives the following approximate confidence ellipsoid:

$$K_s = \left\{ \overline{Y}. \, \middle| \, n(\overline{y}.-\overline{Y}.)^t s^{-1}(\overline{y}.-\overline{Y}.) \leq \chi^2_{1-\alpha:p} \right\}$$

To determine the necessary sample size we fix the desired confidence level and the desired maximal volume of the confidence ellipsoid. Note that the volume of a p-dimensional ellipsoid is given by $$V = const(p) \prod_{k=1}^{p} h_k$$

where $h_k$ k=1, ..., p denote the semiaxes of the ellipsoid and const(p) is a constant depending on the dimension p.

If one defines a maximal admissible confidence volume V*, then it follows, that $$V^* = const(p) n^{-\frac{p}{2}} (\chi^1_{(1-\alpha):p})^{\frac{p}{2}} \sqrt{\det s}$$

From this equation we get for the necessary n as sample size:

$$n_{V^*} const(p)^{\frac{p}{2}} \frac{\chi^2_{(1-\alpha):p} (\det s)^{\frac{1}{p}}}{(V^*)^{\frac{2}{p}}}$$

Related with this equation for the necessary sample size are the following two problems:

a. the constant const(p) depends on the dimension p
b. one needs an a-priori estimate of the covariance matrix To solve these problems one can propose the following: One encloses the confidence ellipsoid with semiaxes $d_k$, k=1, ..., p by a brick with side lengths 2 $d_k$, k=1, ..., p.

Consequently with respect to the volume the largest ellipsoid enclosed by that brick has the volume:

$$V^*_{max} = const(p) \prod_{k=1}^{p} d_k$$

From this formula it is possible to deduce the following necessary sample size n:

$$n^* = \chi^2_{(1-\alpha):p} \left( \prod_{k=1}^{p} \frac{s^2_{y:k}}{d_k^2} \right)^{\frac{1}{p}} \qquad \text{eq. 9}$$

where $$s^2_{y:k}$$

is the k-th diagonal element of the covariance matrix s.

If we define quantities $\epsilon_k$ by the relation:

$$2 d_k = \epsilon_k s_{y:k} \Leftrightarrow d_k = \frac{1}{2} \epsilon_k s_{y:k} \qquad \text{eq. 10}$$

then the necessary sample size would be given in terms of relative precision $$\frac{1}{2} \epsilon_k,$$

that means the lengths of the semiaxes are a fraction of the standard deviations $s_{y:k}$.

Therefore the necessary sample size can be expressed in terms of the $\epsilon_k$:

$$n^* = \chi^2_{(1-\alpha):p} \left( \prod_{k=1}^{p} \frac{4}{\epsilon_k^2} \right)^{\frac{1}{p}} = \chi^2_{(1-\alpha):p} 4 \left( \prod_{k=1}^{p} \frac{1}{\epsilon_k^2} \right)^{\frac{1}{p}} \qquad \text{eq. 11}$$

With such a necessary sample size n* the corresponding confidence ellipsoid would be enclosed by a brick of side lengths $2 d_k$ with $2 d_k = \epsilon_k s_{y:k}$.

Choosing all $\epsilon_k$ equal a desired relative precision $\epsilon$, then we get for the necessary sample size:

$$n^* = \chi^2_{(1-\alpha):p} 4 \frac{1}{\epsilon^2} \qquad \text{eq. 12}$$

which can serve as a formula for practitioners, especially in cases where p is quite large.

Finally we will deal with the following problem: Due to the fact that we took a sample from the whole population, we can only compare the estimates for a support with the desired minimal support chosen by the user. Therefore we encounter the problem that due to random variations we might get an estimator which is just by chance below the given minimal support. This means that we should be interested in a statistical measure how significant this situation is related to a considered item or variable. From the statistical point of view this leads to the theory of simultaneous confidence intervals which we will deal next.

These intervals can be received from a constructed confidence ellipsoid as following.

For arbitrary $x \in \Re$ and A assumed as a positive definite p×p-matrix we get:

$$x^t A^{-1} x = \sup_{v \in \Re^p - \{0\}} \frac{(x^t v)^2}{v^t A v}$$

based on this expression we get for the ellipsoid K:

$$K_s = \left\{ \overline{Y}. \in \Re^p : \sup_{v \in \Re^p - \{0\}} \frac{((\overline{y}. - \overline{Y}.)^t v)^2}{v^t s v} \le \frac{1}{n} \chi^2_{(1-\alpha):p} \right\}$$

$$= \left\{ \overline{Y}. \in \Re^p : \forall_{v \in \Re^p - \{0\}} |(\overline{y}. - \overline{Y}.)^t v| \le \sqrt{\frac{1}{n} \chi^2_{(1-\alpha):p} v^t s v} \right\}$$

$$= \bigcap_{v \in \Re^p - \{0\}} \left\{ \overline{Y}. \in \Re^p : |(\overline{y}. - \overline{Y}.)^t v| \le \sqrt{\frac{1}{n} \chi^2_{(1-\alpha):p} v^t s v} \right\}$$

Therefore we can embed K directly into a p-dimensional brick which is given as the product of the intervals $$KI(k) = \left\{ \overline{Y}.^{(k)} \in \Re : |\overline{y}.^{(k)} - \overline{Y}.^{(k)}| \le \sqrt{\frac{1}{n} \chi^2_{(1-\alpha):p} s^2_{y:k}} \right\}$$

if v is the k-th unit vector (k=1, ..., p).

Every of these intervals is denoted as a simultaneous confidence interval. Componentwise we get an interval for $\overline{Y}.^{(k)}$:

$$\overline{y}.^{(k)} \pm \sqrt{\frac{1}{n}\chi^2_{(1-\alpha);p} s^2_{y;k}} \qquad \text{eq. 13}$$

4.3.3 Process Flow for Sampling of Association Rules

FIG. 3 visualizes the process flow for sampling of association rules in multivariate case outlined in the previous chapter.

In step 301 a decision is made whether data mining for association rules should be performed based on the complete multitude of transaction records (choosing path 302) or based on a sample (choosing path 303). In case path 302 is selected the methodology for mining of association is applied within step 304 followed by a steps 305 to visualize the computed association rules.

If the association rules are to be computed based on a sample by taking path 303 first the sample size has to be determined within step 306. One approach would consist in specifying the sample size directly. Another approach would consist in a step to calculate the sample size. In the multivariate approach the sample size would be calculated based on:

a. the number p of different items occurring within the multitude of transactions as parameter for more thoroughly characterizing the multitude of transactions,
b. further precision requirements for a quality of the approximation comprising for example:
   b1. the confidence $(1-\alpha)$ for an estimation based on a sample
   b2. relative precision requirements $\epsilon_k$ for the individual items or a common precision requirement $\epsilon$ for all items according to eq. 10. If some items need to be estimated with a higher degree of precision than others then the approach to specify relative precision requirements for the individual items has to be selected.

Based on these specifications an estimated sample size will be calculated within step 307 according to the approximation formulas eq. 11 or 12. This estimated sample size can be used directly as sample size or may be used as an orientation only. In the later case the final sample size would have to be chosen at least in the order of magnitude of the estimated sample size.

Based on the multitude of records and the calculated sample size the final sample will be drawn by random sampling in step 308.

Using this sample as input the state of the art methodologies for mining of association may be applied within step 304 to determine the estimated association rules followed by a step 305 to visualize the estimated association rules.

If step 306 would also comprise the specification of a required minimal support value then in step 305 even a decision would be possible whether a considered association rule is of interest or not. For this purpose the simultaneous confidence intervals calculated within eq. 13 can be exploited. The following decision process would be applied:

1. if a confidence interval according to eq. 13 is completely on the left side of this minimal support value (i.e. the upper bound of this interval is smaller than the minimal support value) then the considered item is not of interest because the estimator of its support is below of the minimal support.
2. if a confidence interval according to eq. 13 for the considered item encloses the minimal support value or is completely on the right side then the item is interesting because the estimator of its support is above of the minimal support (remember that one defines an item as interesting if its support value is larger or equal the predefined minimal support value).

Due to the construction of these confidence intervals one can be sure that one gets all interesting rules with common confidence $(1-\alpha)$.

4.4 Applications

According to the state-of-the-art it was necessary, because of the huge size of the data making up the multitude of transaction records and the extreme long processing time for calculating the association rules, that the computer system computing the association is identical with the computer system storing the multitude of transaction records. As the current invention is capable to reduce the amount of data the actual mining technology is applied to a very small sample of transaction records only (extremely small compared to the complete multitude of transaction records) a new distributed processing model comprising a client computer and a server computer connected by some communication network like the Internet is suggested.

FIG. 4 depicts a distributed processing model for mining of association rules.

Within FIG. 4 a client computer 401 is shown for controlling determination of association rules. The client stores the multitude of N transaction records 402. The client computer is drawing within step 403 a sample 404 from the multitude of N transactions with a sample size n. The sample size may be determined by any of the previous disclosed approaches.

Using the communication network 405 the sample is transmitted to the server computer 406 providing a specific service for mining of association rules. Within steps 407 the association rules are calculated based on the provided sample and returned to the client computer across the communication network. Since now the time for the analysis is small (being based on a small sample only) it is possible to send back the resulting approximate rules very quickly.

Finally these rules may then be analyzed for further activities on the client system within step 408.

Depending on the extent of the provided service for mining of association rules on the server system two different embodiments are possible: either the client computer itself is determining the sample size, or the server computer is responsible for determining the sample size. In any case the technology disclosed within the current specification for determining the sample size is exploited.

The invention claimed is:

1. A computerized data mining method for determining association rules within N transactions, said method comprising:
   determining a minimum sample size n* of said N transactions, each transaction comprising p different items for characterizing each transaction, p being at least 2, wherein said minimum sample size n* is determined based on a multivariate estimation analysis for achieving precision requirements;
   computing association rules based on a sample of n transactions of said N transactions according to a methodology for mining of association rules, said n being at least n* and less than N, said computed association rules being an estimation of association rules of said N transactions, said computing association rules being performed by a server computer, said computing association rules based on the sample of n transactions of said N transactions resulting in a reduction in processing time for computing the association rules as compared with computing the association rules based on the N transactions; and sending, by the server computer, the computed association rules across a communication network to a memory of a client computer for subsequent usage by the client computer, wherein said precision requirements comprise:

a confidence level $(1-\alpha)$ for the minimum sample size n*, wherein $\alpha$ is a specified probability of an error for the minimum sample size n*; and a relative precision $\epsilon_k$ for an item k of a sample, said relative precision $\epsilon_k$ defining an acceptable deviation of the support value of item k within the sample of n transactions of said N transactions as compared to the support value of item k within said N transactions, said relative precision $\epsilon_k$ being measured relative to the standard deviation of the support value of item k.

2. The method of claim 1, wherein $$n^* = \chi^2_{(1-\alpha):p} 4 \left( \prod_{k=1}^{p} \frac{1}{\epsilon_k^2} \right)^{\frac{1}{p}}$$

with $\chi_{1-\alpha:p}^2$ being the percentile of the $\chi^2$-distribution with p degrees of freedom.

3. The method of claim 2, wherein said relative precision $\epsilon_k = \epsilon$ is identical for all items k, and wherein $$n^* = \chi^2_{(1-\alpha):p} 4 \frac{1}{\epsilon^2}.$$

4. The method of claim 1, wherein said methodology for mining association rules is an APRIORI methodology.

5. The method of claim 1, wherein said method further comprises random sampling said at least n transactions of said N transaction to determine said sample of at least n transactions of said N transactions.

6. A computer program product comprising a computer readable medium having computer readable program code embodied therein, the computer readable program code being configured to carry out the method of claim 1.

7. A data processing system comprising a computer usable medium having computer readable program code embodied therein, said computer code configured to perform the method of claim 1.

8. A computerized data mining method for determining association rules within N transactions, said method comprising:

determining a minimum sample size n* of said N transactions, each transaction comprising different items for characterizing each transaction, wherein said minimum sample size n* is determined based on a univariate estimation analysis for achieving precision requirements for association rules, wherein said precision requirements comprise a confidence level $(1-\alpha)$ for said minimum sample size n*, wherein $\alpha$ is a specified probability of an error for the minimum sample size n*, wherein said precision requirements comprise a relative precision $\delta$ defining an acceptable deviation of the support value of a certain rule within a sample of n transactions of said N transactions as compared to the support value of said certain rule within said N transactions, said relative precision $\delta$ measured relative to the support value of said certain rule, and wherein said precision requirements comprise a lower boundary p for an expected support value of said certain rule;

computing association rules based on said sample of said n transactions of said N transactions according to a methodology for mining of association rules, said n being at least n* and less than N, said association rules being an estimation of association rules of said N transactions, said computing association rules being performed by a server computer, said computing association rules based on the sample of n transactions of said N transactions resulting in a reduction in processing time for computing the association rules as compared with computing the association rules based on the N transactions; and sending, by the server computer, the computed association rules across a communication network to a memory of a client computer for subsequent usage by the client computer.

9. The method of claim 8, wherein $$n^* = \frac{u_{1-\frac{\alpha}{2}}^2 Np(1-p)}{(N-1)\delta^2 p^2 + u_{1-\frac{\alpha}{2}}^2 p(1-p)}$$

with $u_{1-\alpha}$ being a percentile of the standard normal distribution.

10. The method of claim 8, wherein p is a minimum support value (Minsup) used by said methodology for mining of association rules.

11. The method of claim 8, wherein said method further comprises random sampling said at least n transactions of said N transaction to determine said sample of at least n transactions of said N transactions.

12. The method of claim 8, wherein:

$$n^* = \frac{u_{1-\frac{\alpha}{2}}^2 Np(1-p)}{(N-1)\delta^2 p^2 + u_{1-\frac{\alpha}{2}}^2 p(1-p)}$$

with $$u_{1-\frac{\alpha}{2}}$$

being a percentile of the standard normal distribution.

13. A computer program product comprising a computer readable medium having computer readable program code embodied therein, the computer readable program code being configured to carry out the method of claim 8.

14. A data processing system comprising a computer usable medium having computer readable program code embodied therein, said computer code configured to perform the method of claim 8.

15. A computerized data mining method for determining association rules within N transactions said method comprising:
- determining a minimum sample size n* of said N transactions based on a univariate estimation analysis for achieving precision requirements for association rules, each transaction comprising different items for characterizing each transaction,
- wherein said precision requirements comprise a confidence (1–α) for said minimum sample size n*, wherein α is a specified probability of an error for the minimum sample size n*,
- wherein said precision requirements comprise an absolute precision d defining an acceptable deviation of the support value of a certain rule within a sample of n transactions of said N transactions as compared to the support value of said certain rule within said N transactions, and
- wherein said precision requirements comprise an upper boundary p for an expected support value of said certain rule;
- computing association rules based on said sample of said n transactions of said N transactions according to a methodology for mining of association rules, said n being at least n* and less than N, said computed association rules being an estimation of association rules of said N transactions, said computing association rules being performed by a server computer, said computing association rules based on the sample of n transactions of said N transactions resulting in a reduction in processing time for computing the association rules as compared with computing the association rules based on the N transactions; and
- sending, by the server computer, the computed association rules across a communication network to a memory of a client computer for subsequent usage by the client computer.

16. The method of claim 15, wherein $$n^* = \frac{\frac{u_{1-\frac{\alpha}{2}}^2 p(1-p)}{d^2}}{1 + \frac{1}{N}\left(\frac{u_{1-\frac{\alpha}{2}}^2 p(1-p)}{d^2} - 1\right)}$$

with $u_{1-\alpha}$ being a percentile of the standard normal distribution.

17. The method of claim 15, wherein p=0.5.

18. The method of claim 15, wherein said method further comprises random sampling said at least n transactions of said N transaction to determine said sample of at least n transactions of said N transactions.

19. The method of claim 15, wherein $$n^* = \frac{\frac{u_{1-\alpha}^2 p(1-p)}{d^2}}{1 + \frac{1}{N}\left(\frac{u_{1-\alpha}^2 p(1-p)}{d^2} - 1\right)}$$

with $u_{1-\alpha/2}$ being a percentile of the standard normal distribution.

20. A computer program product comprising a computer readable medium having computer readable program code embodied therein, the computer readable program code being configured to carry out the method of claim 15.

21. A data processing system comprising a computer usable medium having computer readable program embodied therein, said computer code configured to perform the method of claim 15.

* * * * *